J. Fricker,
Fire Plug,
N° 50,235.
Patented Oct. 3, 1865.

Witnesses
James H. Layman
Geo. B. Nicholson

Inventor
J. Fricker
By Knight Bros
atty's.

UNITED STATES PATENT OFFICE.

JACOB FRICKER, OF CINCINNATI, OHIO.

IMPROVEMENT IN FIRE-PLUGS.

Specification forming part of Letters Patent No. 50,235, dated October 3, 1865.

*To all whom it may concern:*

Be it known that I, JACOB FRICKER, of Cincinnati, Hamilton county, Ohio, have invented a new and useful Improvement in Fire-Plugs; and I do hereby declare the following to be a full, clear, and exact description thereof, reference being had to the accompanying drawings, making part of this specification.

My invention is an improvement on the common fire-plug used in the streets, whereby it is made more durable, more easy of operation, and neither subject to the action of frost nor to the unnecessary waste of water.

Figure 1:
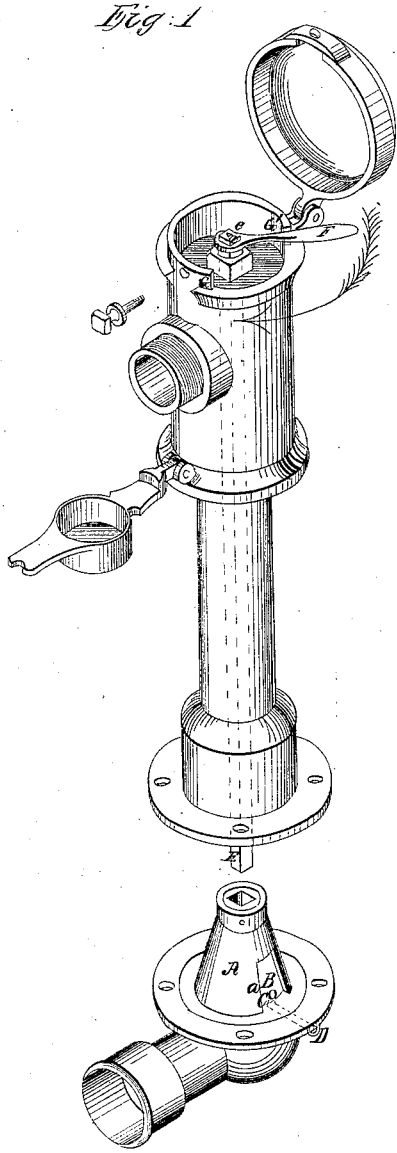
Figure 2:
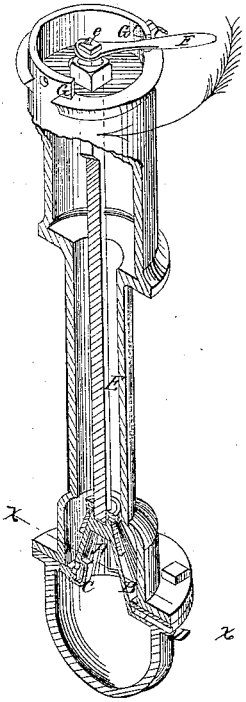
Figure 3:
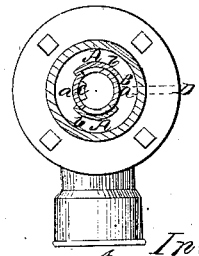

Figure 1 is a perspective view of a plug embodying my improvements, the same being in the closed condition and with the wasteway open. Fig. 2 is an axial section of the same, with the plug shifted half-way round, so as to disconnect the wasteway for summer use, and Fig. 3 a horizontal section taken at the line X X of Fig. 2.

My plug-chamber A has the form of a hollow truncated cone, open at top and bottom, and having two opposite and equal ports, $a\ a'$. Properly fitted within the chamber A is a conical plug, B, having opposite ports, $b\ b'$, corresponding to those of the chamber A. One of the blanks of the plug, about midway between the ports, has a small duct, C, which, descending and passing outward, connects, when the plug is closed, with a wasteway or drip-hole, D, provided in the chamber.

E is a valve-stem, whose handle F is limited to a quarter-circle vibration by stops G G'.

$e$ is a mark on the top of the stem to indicate the position of the wasteway, so as to enable the operator to place the same either in or out of operation. (See Figs. 1 and 2 respectively.)

A distinguishing peculiarity of my invention is the provision for turning the wasteway out of use except during freezing weather. This is effected by unshipping the handle F and having turned the plug half around replacing the said handle in a position the reverse of what it previously occupied upon the stem. (See Figs. 1 and 2 respectively.) By this simple provision I enable the avoidance of the waste of water during that protracted season of the year which is either free from frost or from such an intensity of it as would endanger the freezing of the contents of the discharge-pipe; and in so doing I avoid aggravating the danger of freezing due to excessive and unnecessary saturation of the ground. It will be seen that the equal and opposite ports insure a perfect balance of forces and enable the plug to be operated without friction or loss of power.

I claim herein as new and of my invention—

The reversible plug B, provided with a wasteway, C, in the described combination with the drip-hole D and stops G G', or devices substantially equivalent, for the purposes described.

In testimony of which invention I hereunto set my hand.

JACOB FRICKER.

Witnesses:
GEO. H. KNIGHT,
JAMES H. LAYMAN.